United States Patent
Wurr et al.

(10) Patent No.: US 11,457,652 B2
(45) Date of Patent: Oct. 4, 2022

(54) FRUIT AND/OR VEGETABLE SNACK PRODUCT AND METHODS OF PRODUCTION AND USE THEROF

(71) Applicant: SOCIÉTÉ DES PRODUITS NESTLÉ S.A., Vevey (CH)

(72) Inventors: Alexander James Wurr, Grand Rapids, MI (US); Quang-Tuan Francois Nguyen, Grand Rapids, MI (US); James Edward Molchan, Rockford, MI (US); Kemal Dunuroglu, Grand Rapids, MI (US); Frank Karl Welch, Kentwood, MI (US); Vivek Dilip Savant, Muskegon, MI (US)

(73) Assignee: Societe des Produits Nestle S.A., Vevey (CH)

( * ) Notice: Subject to any disclaimer, the term of this patent is extended or adjusted under 35 U.S.C. 154(b) by 159 days.

(21) Appl. No.: 16/373,807

(22) Filed: Apr. 3, 2019

(65) Prior Publication Data
US 2019/0357575 A1 Nov. 28, 2019

Related U.S. Application Data (60) Provisional application No. 62/779,017, filed on Dec. 13, 2018.

(51) Int. Cl.
| | |
|---|---|
| *A23L 7/17* | (2016.01) |
| *A23P 30/25* | (2016.01) |
| *A23L 19/00* | (2016.01) |
| *A23P 10/28* | (2016.01) |
| *A23L 33/00* | (2016.01) |

(52) U.S. Cl.
CPC ............ *A23L 7/17* (2016.08); *A23L 19/09* (2016.08); *A23L 33/40* (2016.08); *A23P 10/28* (2016.08); *A23P 30/25* (2016.08); *A23V 2002/00* (2013.01)

(58) Field of Classification Search
CPC .. A23L 7/17; A23L 33/40; A23L 19/09; A23P 10/28; A23P 30/25; A23V 2002/00
USPC ........................................................ 426/18
See application file for complete search history.

(56) References Cited

U.S. PATENT DOCUMENTS

| | | | |
|---|---|---|---|
| 8,414,940 B2 | 4/2013 | Awad | |
| 2007/0178219 A1* | 8/2007 | Boudreaux | ............. A23L 19/00 426/637 |
| 2009/0202700 A1* | 8/2009 | Bunke | ................. A21D 10/025 426/549 |
| 2012/0004007 A1 | 2/2012 | Chatel et al. | |
| 2015/0173401 A1* | 6/2015 | Neaud | ...................... A23L 5/55 426/550 |
| 2015/0020164 A1 | 7/2015 | Fosdick et al. | |
| 2015/0282507 A1 | 10/2015 | Rizvi et al. | |
| 2016/0004493 A1 | 1/2016 | Yamada | |

(Continued)

FOREIGN PATENT DOCUMENTS

| | | | | |
|---|---|---|---|---|
| EP | 1872666 A1 * | 1/2008 | ............. | A23L 7/126 |
| EP | 1 681 943 | 3/2012 | | |
| EP | 2 387 320 | 11/2013 | | |

(Continued)

*Primary Examiner* — Hamid R Badr
(74) *Attorney, Agent, or Firm* — K&L Gates LLP (57) ABSTRACT

Shelf stable, expanded or popped snack products are disclosed that contain at least one fruit ingredient and/or at least one vegetable ingredient. Also disclosed are methods of producing and using the snack products.

20 Claims, 9 Drawing Sheets

(56) References Cited

U.S. PATENT DOCUMENTS

2016/0021301 A1  7/2016  Johnson
2016/0030975 A1  10/2016 Kemboi et al.

FOREIGN PATENT DOCUMENTS

GB          2548842    * 10/2017  ............... A23L 7/17
WO        2017/167644    10/2017

* cited by examiner

FRUIT AND/OR VEGETABLE SNACK PRODUCT AND METHODS OF PRODUCTION AND USE THEROF

CROSS REFERENCE TO RELATED APPLICATIONS/INCORPORATION BY REFERENCE STATEMENT

The subject application claims benefit under 35 USC § 119(e) of provisional application U.S. Ser. No. 62/779,017 filed 13 Dec. 2018; the entire contents of which are expressly incorporated herein by reference.

STATEMENT REGARDING FEDERALLY SPONSORED RESEARCH OR DEVELOPMENT

Not Applicable.

BACKGROUND

Expanded or popped snacks have become an increasingly popular type of snack product in recent years, especially for infants and toddlers. It is known that infants and toddlers may consume up to 25% of their calories from snack products; therefore, it is desirable to include nutritious, wholesome ingredients in these products. However, most expanded or popped snacks include topical flavors and/or nonnutritive sweeteners (NNS) rather than natural ingredients to meet the aroma, taste, and texture requirements of consumers. At most, the expanded or popped snacks may include a minimal amount of fruit (such as in the form of a puree or juice concentrate) for the purpose of claiming the presence of "natural flavors" in the resulting product; however, no expanded or popped snack includes enough fruit or vegetable to provide even a fraction of a serving of fruit or vegetable to the consumer.

The current industry method for producing expanded or popped snacks includes the use of Direct Expansion (DX) technology. DX technology, by nature, maximizes efficiency by minimizing moisture in the dough so that there is less process waste from the dough to an expanded snack. However, current DX technology generates high levels of process contaminants (such as, but not limited to, acrylamide and furan) during processing due to the high temperatures and pressures utilized.

Therefore, there is a need in the art for new and improved expanded/popped snack products that include a sufficient amount of natural ingredient(s) and minimal to no levels of process contaminants that overcome the disadvantages and defects of the prior art. It is to such snack products, as well as methods of producing and using same, that the present disclosure is directed.

DETAILED DESCRIPTION

Before explaining at least one non-limiting embodiment of the method in detail by way of exemplary language and results, it is to be understood that the present disclosure is not limited in its application to the details of construction and the arrangement of the components set forth in the following description. The present disclosure is capable of other embodiments or of being practiced or carried out in various ways. As such, the language used herein is intended to be given the broadest possible scope and meaning, and the embodiments are meant to be exemplary—not exhaustive. Also, it is to be understood that the phraseology and terminology employed herein is for the purpose of description only and should not be regarded as limiting.

Unless otherwise defined herein, mechanical and technical terms used in connection with the present disclosure shall have the meanings that are commonly understood by those of ordinary skill in the art. Further, unless otherwise required by context, singular terms shall include pluralities, and plural terms shall include the singular. The foregoing products and methods are generally produced and performed according to conventional methods well known in the art and as described in various general and more specific references that are cited and discussed throughout the present specification.

All patents, published patent applications, and non-patent publications mentioned throughout the specification are indicative of the level of skill of those skilled in the art to which this present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, products, and/or methods disclosed herein can be made and executed without undue experimentation in light of the present disclosure. While the compositions, products, and methods of the present disclosure have been described in terms of particular embodiments, it will be apparent to those of skill in the art that variations may be applied to the compositions, products, and/or methods and in the steps or in the sequence of steps of the methods described herein without departing from the concept, spirit, and scope of the present disclosure. All such similar substitutions and modifications apparent to those skilled in the art are deemed to be within the spirit, scope, and concept of the present disclosure as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive, although the disclosure also supports a definition that refers to only alternatives and "and/or." For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one non-limiting embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition, product, etc., the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art. The term "about" can also be understood to refer to numbers in a range of numerals. Moreover, all numerical ranges herein should be understood to include all integers, whole or fractions, within the range.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the term "added" is understood to refer to an element that is introduced into a composition and not to the element as it may naturally inherently exist in a composition.

When the content of one ingredient is expressed as "w/w," this expression indicates weight percentage (the ratio or percentage of one substance out of the total) of the ingredient in the composition. When the content of one ingredient is expressed as "w/w dry matter" or "dry w/w," these expressions indicate dry weight percentage (the ratio or percentage of one substance out of the total) of the ingredient in the dry composition.

The term "concentration ratio" as used herein will be understood to indicate a ratio between concentrations of odorants measured in the same sample of heat treated product.

The term "concentration factor" as used herein will be understood to indicate a ratio between concentrations of a single odorant (or other substance) measured in two different samples.

The term "sugar" or "sugars" as used herein includes available monosaccharides (such as, but not limited to, galactose, fructose, and glucose), available disaccharides (such as, but not limited to, sucrose, lactose, and maltose), or mixtures thereof.

The term "reducing sugar" as used herein refers to any sugar that is capable of acting as a reducing agent because it has a free aldehyde group or a free ketone group or is capable of forming such a group in solution through isomerization. Non-limiting examples of reducing sugars include: fructose, glucose, xylose, tagatose, rhamnose, maltose, lactose, fucose, arabinose, and galactose, as well as any mixtures thereof.

The term "flavor" and "flavors" as used herein refers to the aroma (volatile compounds) and the taste (non-volatile compounds) which are comprised in a food or beverage product. Such flavor can be detected or assessed by different means, including for example (but not by way of limitation) sensory and analytical means. In one embodiment, the flavor generated according to the present disclosure is delivered by volatile compounds.

The term "shelf-stable" as used herein refers to the ability of a food product to be safely stored and sold in a sealed container at ambient or room temperature while still having a useful shelf life in which the taste, texture, and nutritional aspects (i.e., nutritional integrity, nutritional potency, etc.) of the product is retained. Examples of periods considered to be a "useful shelf life" include, but are not limited to, at least about two months, at least about three months, at least about four months, at least about five months, at least about six months, at least about twelve months, and longer.

As used herein, the term "thermal processing" refers to a food sterilization technique in which the food is heated at a temperature high enough to destroy microorganisms and enzymes present therein. The specific amount of time required depends upon the specific food and the growth habits of the enzymes or microorganisms. Both the texture and the nutritional content of the food may be altered due to thermal processing. Some examples of thermal processing include, but are not limited to: Retort, Ultra-High Temperature (UHT) or Aseptically processing, pasteurization, ultra-pasteurization, hot fill, Extended Shelf Life (ESL), Microwave-Assisted Thermal Sterilization (MATS), High- and Ultra-High-Pressure Processing (HPP/UHPP), and High-Intensity Light Pulse (HILP) processing, as well as others that are recognized in the industry, and any combination thereof.

As used herein, the term "fruit" or "fruit ingredient" is intended to include fruit solids, including (but not limited to) fresh fruits, fruit powder, fruit puree, fruit paste, and combinations thereof, as well as any form of fruit liquid (including, but not limited to, fruit juice or fruit juice concentrates). The raw fruit ingredient may be utilized with or without its skin or peel.

As used herein, the term "vegetable" or "vegetable ingredient" is intended to include vegetable solids, including (but not limited to) fresh vegetables, vegetable powder, vegetable puree, vegetable paste, and combinations thereof, as well as any form of vegetable liquid (including, but not limited to, vegetable juice or vegetable juice concentrate). The raw vegetable ingredient may be utilized with or without its skin or peel.

Turning now to the methods of the present disclosure, these methods provide, for the first time, direct expansion, air popped, and/or compression popped snack products that have a high content of real fruit(s) and/or vegetable(s) and a reduced level of process contaminant(s) (such as, but not limited to, acrylamide and/or furan) and that are suitable for children aged 6 months to 48 months. The methods allow for the use of natural single-strength or multi-strength fruit and/or vegetable ingredients (such as, but not limited to, purees and/or powders) as ingredients in direct expansion, air popped, and/or compression popped snacks that are developmentally appropriate for children and that have, for example (but not by way of limitation), reduced acrylamide levels.

Certain non-limiting embodiments of the present disclosure are directed to a shelf stable, expanded or popped snack product designed for consumption by a child; in particular (but non-limiting) embodiments, the product is designed to be developmentally appropriate for consumption by a child aged between about 6 months to about 48 months. The expanded or popped snack product includes at least one whole grain ingredient in combination with at least one fruit ingredient and/or at least one vegetable ingredient. The fruit and/or vegetable ingredient(s) is present in a substantial amount; for example (but not by way of limitation), the fruit and/or vegetable ingredient(s) may be present in an amount substantial enough so that a single serving of the product comprises at least about 0.25 serving of fruit and/or vegetable. In addition, the expanded or popped snack product may include one or more additional ingredients, such as (but not limited to), at least one processing aid, at least one added vitamin or mineral, added water, and the like.

A single serving of the expanded or popped snack product may comprise any level of serving(s) of fruit and/or vegetable that allows the product to be a nutritious and wholesome snack and allows the product to function in accordance with the present disclosure. For example (but not by way of limitation), a single serving of the product may comprise a serving amount of fruit and/or vegetable of at least about 0.5 serving, at least about 0.75 serving, at least about 1 serving, at least about 1.25 servings, at least about 1.5 servings, at least about 1.75 servings, at least about 2 servings, at least about 2.25 servings, at least about 2.5 servings, at least about 2.75 servings, at least about 3 servings, at least about 3.5 servings, at least about 4 servings, at least about 4.5 servings, at least about 5 servings, and higher servings. In other non-limiting examples, the serving amount of fruit and/or vegetable present in the product may be in a range of any of the values listed above, such as (but not limited to) a range of from about 0.25 to about 5 servings, a range of from about 0.5 to about 4 servings, a range of from about 1 to about 3 servings, etc.

The fruit and/or vegetable ingredient(s) present in the expanded or popped snack product may be single-strength (i.e., a single fruit or vegetable ingredient) or multi-strength (i.e., two or more fruit and/or vegetable ingredients). When multi-strength, the expanded or popped snack product may contain two or more fruit ingredients, two or more vegetable ingredients, or one or more fruit ingredients in combination with one or more vegetable ingredients.

The fruit and/or vegetable ingredient(s) may be provided in any form described or otherwise contemplated herein, such as (but not limited to) solids, liquids, purees, powders, pastes, juices, etc. In a particular (but non-limiting) embodiment, the fruit and/or vegetable ingredient comprises one or more fruit and/or vegetable puree(s).

Any type of fruit known in the art or otherwise contemplated herein may be utilized in accordance with the present disclosure. Specific non-limiting examples of fruit ingredients include strawberry, pear, apple, avocado, banana, blackberry, blueberry, cherry, orange, clementine, tangerine, apricot, plum, prune, kiwifruit, mango, cantaloupe, melon, grape, raisin, grapefruit, raspberry, cranberry, jackfruit, lemon, lime, watermelon, peach, nectarine, pineapple, and the like, as well as any combinations thereof.

Any type of vegetable ingredient known in the art or otherwise contemplated herein may be utilized in accordance with the present disclosure. Specific non-limiting examples of vegetable ingredients include tomato, spinach, cauliflower, carrot, potato, squash, sweet potato, kale, beet, chickpea, broccoli, brussel sprouts, cabbage, okra, green bean, lettuce, mushroom, pea, various types of legumes, and the like, as well as any combinations thereof.

The fruit and/or vegetable ingredient(s) may be present in the expanded or popped snack product at any concentration that allows the ingredient(s) to provide the serving level described herein above and allows the product to be produced and function in accordance with the present disclosure. For example, the fruit and/or vegetable ingredient(s) can be present at any percent concentration (dry w/w), including (but not limited to): about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, at least about 40%, at least about 45%, at least about 50%, and the like. In addition, the concentration of the fruit and/or vegetable ingredient(s) may fall within a range of any two of the values listed above, such as (but not limited to): a range of from about 5% to about 15%, a range of from about 10% to about 20%, a range of from about 15% to about 25%, a range of from about 20% to about 30%, a range of from about 30% to about 40%, a range of from about 40% to about 50%, a range of from about 5% to about 20%, a range of from about 10% to about 25%, a range of from about 15% to about 30%, a range of from about 20% to about 35%, a range of from about 25% to about 40%, a range of from about 30% to about 45%, a range of from about 35% to about 50%, a range of from about 5% to about 25%, a range of from about 10% to about 30%, a range of from about 15% to about 35%, a range of from about 20% to about 40%, a range of from about 25% to about 45%, a range of from about 30% to about 50%, a range of from about 10% to about 40%, a range of from about 20% to about 50%, and the like.

Any type of whole grain ingredient known in the art or otherwise contemplated herein may be utilized in accordance with the present disclosure. Specific non-limiting examples of whole grain ingredients include rice flour, wheat flour, tapioca flour, whole grain corn flour, and the like, as well as any combinations thereof.

The at least one whole grain ingredient may be present in the expanded or popped snack product at any concentration that allows the product to be produced and function in accordance with the present disclosure. For example, the whole grain ingredient(s) can be present at any percent concentration (dry w/w), including (but not limited to): about 30%, about 35%, about 40%, about 45%, about 50%, about 55%, about 60%, about 65%, about 70%, about 75%, about 80%, about 85%, about 90%, and about 95%, as well as any value therebetween. In addition, the concentration of the whole grain ingredient(s) may fall within a range of any two of the values listed above, such as (but not limited to) a range of from about 40% to about 50%, a range of from about 50% to about 60%, a range of from about 60% to about 70%, a range of from about 70% to about 80%, a range of from about 80% to about 90%, a range of from about 40% to about 55%, a range of from about 45% to about 60%, a range of from about 50% to about 65%, a range of from about 55% to about 70%, a range of from about 60% to about 75%, a range of from about 65% to about 80%, a range of from about 70% to about 85%, a range of from about 40% to about 60%, a range of from about 45% to about 65%, a range of from about 50% to about 70%, a range of from about 55% to about 75%, a range of from about 60% to about 80%, a range of from about 65% to about 85%, a range of from about 70% to about 90%, a range of from about 30% to about 55%, a range of from about 35% to about 60%, a range of from about 40% to about 65%, a range of from about 45% to about 70%, a range of from about 50% to about 75%, a range of from about 55% to about 80%, a range of from about 60% to about 85%, a range of from about 65% to about 90%, a range of from about 30% to about 60%, a range of from about 40% to about 70%, a range of from about 45% to about 75%, a range of from about 50% to about 80%, a range of from about 55% to about 85%, a range of from about 60% to about 90%, a range of from about 30% to about 65%, a range of from about 40% to about 75%, a range of from about 50% to about 85%, a range of from about 55% to about 90%, a range of from about 30% to about 70%, a range of from about 40% to about 80%, a range of from about 45% to about 85%, a range of from about 50% to about 90%, and the like.

In a particular (but non-limiting) embodiment, the at least one fruit and/or vegetable ingredient is present in a range of from about 10% to about 30% dry w/w of the product (in reconstituted form, as described herein below), and the at least one whole grain ingredient is present in an amount in a range of from about 60% to about 85% dry w/w of the product (in reconstituted form). In a further particular (but non-limiting) embodiment, the at least one whole grain ingredient comprises rice flour and wheat flour, and the rice flour is present in a range of from about 40% to about 50%, while the wheat flour is present in a range of from about 20% to about 35% dry w/w of the product (in reconstituted form).

As stated herein above, the expanded or popped snack product may include one or more additional ingredients, such as (but not limited to), at least one processing aid. Non-limiting examples of processing aids that may be utilized in accordance with the present disclosure include calcium carbonate, citric acid, and asparaginase, as well as any combinations thereof. Processing aid(s) serve to increase expansion and to mitigate formation of processing contaminants such as (but not limited to) acrylamide and furan.

The at least one processing aid can be present at any percent concentration (dry w/w), including (but not limited to): about 0.001%, about 0.005%, about 0.01%, about 0.05%, about 0.1%, about 0.5%, about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.95%, about 0.95%, about 1%, about 1.25%, about 1.5%, about 1.75%, about 2%, about 2.25%, about 2.5%, about 2.75%, about 3%, and the like, as well as any value therebetween. In addition, the concentration of the at least one processing aid may fall within a range of any two of the values listed above, such as (but not limited to), a range of from about 0.001% to about 3%, a range of from about 0.005% to about 2%, a range of from about 0.01% to about 1%, and the like.

One of the advantages of the methods of the present disclosure is that the production of process contaminants (such as, but not limited to, acrylamide and furan) is reduced when compared to prior art methods. For example, in certain non-limiting embodiments, the expanded or popped snack product has an acrylamide concentration of less than about 250 ppm, such as (but not limited to), less than about 240 ppm, less than about 230 ppm, less than about 220 ppm, less than about 210 ppm, less than about 200 ppm, less than about 190 ppm, less than about 180 ppm, less than about 170 ppm, less than about 160 ppm, less than about 150 ppm, less than about 140 ppm, less than about 130 ppm, less than about 120 ppm, less than about 110 ppm, less than about 100 ppm, less than about 90 ppm, less than about 80 ppm, less than about 70 ppm, less than about 60 ppm, less than about 50 ppm, and the like. In a particular (but non-limiting) embodiment, the snack product has an acrylamide concentration of less than about 150 ppm.

As stated herein above, the expanded or popped snack product may further contain one or more added vitamin(s) or mineral(s) to increase the nutritional value of the product. Non-limiting examples of vitamins and minerals that may be added include calcium, iron, Vitamin E, thiamin, niacin, Vitamin B6, Vitamin B12, Vitamin A, Vitamin C, riboflavin, folate, zinc, phosphorous, and the like, as well as any combinations thereof. In addition, the amount of each vitamin and mineral present in a single serving of the expanded/popped snack product may provide any percentage of Daily Value therefor, such as (but not limited to), about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 35%, about 40%, about 45%, about 50%, about 55%, about 60%, about 65%, about 70%, about 75%, about 80%, about 85%, about 90%, about 95%, and the like. Also, the percent Daily Value may fall within a range of any two of the values listed above. The Daily Value may be based upon the value for an infant (i.e., up to 12 months) or for a child (i.e., aged 12-36 months or 12-48 months).

In addition, in particular (but non-limiting) embodiments, the expanded or popped snack product has a moisture content of about 2.5% or greater (dry w/w).

Further, in particular (but non-limiting) embodiments, the expanded or popped snack product contains substantially no topical flavors and substantially no nonnutritive sweeteners (NNS).

In certain non-limiting embodiments, the texture of the expanded or popped snack product should be age appropriate for children aged in a range of from about 6 months to about 48 months, as per the model defined in Applicant's U.S. Pat. No. 9,691,029, entitled "Methods for Predicting Age- or Developmental Stage-Appropriate Foods for Children," issued Jun. 27, 2017. This model includes, but is not limited to, the attributes of ease of swallow, residual mouthcoating, firmness, and breakdown, as shown in Table 2 of the '029 patent (which is reproduced herein below as Table 1).

TABLE 1

Examples of Driving Texture Attributes for Snack Food Products*

| Attribute | Crawler | Crawler 10+ | Toddler | Preschooler |
|---|---|---|---|---|
| Ease of Swallow | 15-20 | 20-25 | 20-65 | >60 |
| Residual Mouthcoating | 10-25 | 10-30 | 10-30 | 10-25 |
| Firmness | 40-70 | 60-70 | 40-70 | 40-70 |
| Breakdown | >80 | 70-80 | 60-80 | 40-60 |

*reproduced from U.S. Pat. No. 9,691,029

Certain non-limiting embodiments of the present disclosure are directed to a method of producing an expanded or popped snack product as described in detail herein above. The method comprises at least the steps of: (a) forming a plurality of pellets from a dough, wherein the dough comprises at least one whole grain ingredient in combination with at least one fruit ingredient and/or at least one vegetable ingredient, each as described in detail herein above; and (b) subjecting the pellets to a treatment step to form the expanded or popped snack product, wherein the treatment step is selected from the group consisting of direct expansion, air popping, and compression popping.

In a certain non-limiting embodiment, a single serving of the product so produced comprises at least about 0.5 serving of fruit and/or vegetable, such as (but not limited to) from about one to about three servings of fruit and/or vegetable.

In a certain non-limiting embodiment, the product has an acrylamide concentration of less than about 150 ppm.

In a certain non-limiting embodiment, step (a) is further defined as extruding the dough through an extrusion die to form the plurality of pellets. Extrusion methods and methods of producing pellets from extruded dough are well known in the art; therefore, no further description thereof is considered necessary for performance of the methods of the present disclosure.

Each of the ingredients may be present in an amount as described in detail herein above. In a certain non-limiting embodiment, the fruit and/or vegetable ingredient(s) is present in the dough in an amount in a range of from about 10% to about 30% dry w/w, and the at least one whole grain ingredient is present in the dough in an amount in a range of from about 60% to about 85% dry w/w. In addition, the at least one whole grain ingredient may comprise rice flour and wheat flour, wherein the rice flour is present in the dough in a range of from about 40% to about 50%, and the wheat flour is present in the dough in a range of from about 20% to about 35% dry w/w.

In a certain non-limiting embodiment, the dough further comprises at least one processing aid, as described in detail herein above. The at least one processing aid may be present at any of the concentrations described herein above.

In a certain non-limiting embodiment, the dough comprises added water in an amount in a range of from about 0.5% to about 15% dry w/w, such that the dough has a total moisture content (puree plus water) in a range of from about 25% to about 40% dry w/w. The resultant expanded or popped snack product has a moisture content of about 2.5% or greater (dry w/w).

EXAMPLES

Examples are provided hereinbelow. However, the present disclosure is to be understood to not be limited in its application to the specific experimentation, results, and laboratory procedures disclosed herein. Rather, the Examples are simply provided as one of various embodiments and are meant to be exemplary, not exhaustive.

This Example is directed toward producing an age appropriate expanded or popped snack product with a high fruit/vegetable content. "Puff"-type snack products containing whole grain ingredients are currently on the market; however, these products do not contain any natural fruit and/or vegetable ingredients or only a minimal amount thereof to act as topical flavoring. Therefore, there is a desire to produce "puff"-type snack products that include a substantial amount of fruit and/or vegetable ingredient(s) to provide the consumer with at least a portion of a serving of fruit/vegetable within each single serving of the snack product.

The current industry method for producing expanded or popped snacks includes the use of Direct Expansion (DX) technology. DX technology, by nature, maximizes efficiency by minimizing moisture in the dough so that there is less process waste from the dough to an expanded snack. However, current DX technology generates high levels of process contaminants (such as, but not limited to, acrylamide and furan) during processing due to the high temperatures and pressures utilized.

bonate, citric, acid, and/or asparaginase) that assist with expansion and that limit the creation of process contaminants.

The methods of the present disclosure combine these aspects together to utilize the higher moisture levels of a pellet so that single-strength and multi-strength fruit and/or vegetable puree(s) can be added to the dough in sufficient amounts along with the addition (if necessary) of processing aid(s) to create a high content fruit and/or vegetable expanded snack product that is low in acrylamide levels and is developmentally appropriate for children such as (but not limited to) those aged 6-48 months. The methods of the present disclosure also include the creation of the expanded/popped snack product whilst foregoing the efficiency of a direct expansion process by increasing the moisture content of the dough by adding single- and/or multi-strength puree to the dough prior to direct expansion of the product.

Methodology

Figure 1:
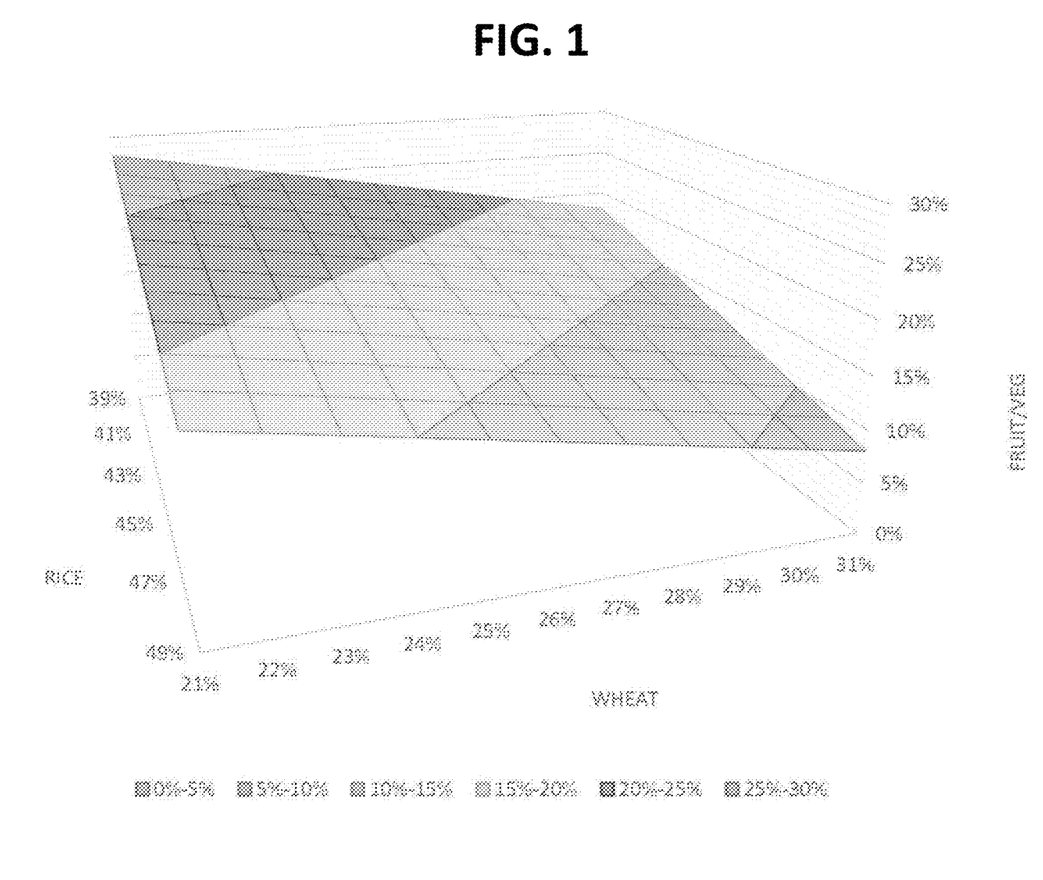
FIG. 1 graphically illustrates a matrix developed to examine batch compositions for dough used in the production of an expanded or popped snack product in accordance with the present disclosure.

In developing recipes for the expanded/popped snack products containing a high fruit/vegetable content, a matrix was developed to examine potential batch compositions to determine how much fruit/vegetable ingredient would need to be present in the formulations to make a substantial regulatory claim. This matrix is shown in FIG. 1 and Table 2. Using these batch compositions, the amount of moisture that needed to be present was calculated as shown in Table 3.

TABLE 2

Batch Composition (Target 25% Puree)

| Rice | Wheat | | | | | | | | | | |
|---|---|---|---|---|---|---|---|---|---|---|---|
| | 31% | 30% | 29% | 28% | 27% | 26% | 25% | 24% | 23% | 22% | 21% |
| 39% | 27% | 28% | 29% | 30% | 31% | 32% | 33% | 34% | 35% | 36% | 37% |
| 40% | 26% | 27% | 28% | 29% | 30% | 31% | 32% | 33% | 34% | 35% | 36% |
| 41% | 25% | 26% | 27% | 28% | 29% | 30% | 31% | 32% | 33% | 34% | 35% |
| 42% | 24% | 25% | 26% | 27% | 28% | 29% | 30% | 31% | 32% | 33% | 34% |
| 43% | 23% | 24% | 25% | 26% | 27% | 28% | 29% | 30% | 31% | 32% | 33% |
| 44% | 22% | 23% | 24% | 25% | 26% | 27% | 28% | 29% | 30% | 31% | 32% |
| 45% | 21% | 22% | 23% | 24% | 25% | 26% | 27% | 28% | 29% | 30% | 31% |
| 46% | 20% | 21% | 22% | 23% | 24% | 25% | 26% | 27% | 28% | 29% | 30% |
| 47% | 19% | 20% | 21% | 22% | 23% | 24% | 25% | 26% | 27% | 28% | 29% |
| 48% | 18% | 19% | 20% | 21% | 22% | 23% | 24% | 25% | 26% | 27% | 28% |
| 49% | 17% | 18% | 19% | 20% | 21% | 22% | 23% | 24% | 25% | 26% | 27% |

TABLE 3

Total Dough Moisture (30-37%, target 35%)

| Rice | Wheat | | | | | | | | | | |
|---|---|---|---|---|---|---|---|---|---|---|---|
| | 3.7% | 3.6% | 3.5% | 3.4% | 3.2% | 3.1% | 3.0% | 2.9% | 2.8% | 2.6% | 2.5% |
| 3.9% | 35% | 35% | 36% | 37% | 38% | 38% | 39% | 40% | 41% | 42% | 42% |
| 4.0% | 34% | 35% | 35% | 36% | 37% | 38% | 38% | 39% | 40% | 41% | 42% |
| 4.1% | 33% | 34% | 35% | 35% | 36% | 37% | 38% | 38% | 39% | 40% | 41% |
| 4.2% | 32% | 33% | 34% | 35% | 35% | 36% | 37% | 38% | 38% | 39% | 40% |
| 4.3% | 32% | 32% | 33% | 34% | 35% | 35% | 36% | 37% | 38% | 38% | 39% |
| 4.4% | 31% | 31% | 32% | 33% | 34% | 35% | 35% | 36% | 37% | 38% | 38% |
| 4.5% | 30% | 31% | 31% | 32% | 33% | 34% | 35% | 35% | 36% | 37% | 38% |
| 4.6% | 29% | 30% | 31% | 31% | 32% | 33% | 34% | 35% | 35% | 36% | 37% |
| 4.7% | 28% | 29% | 30% | 31% | 31% | 32% | 33% | 34% | 34% | 35% | 36% |
| 4.8% | 28% | 28% | 29% | 30% | 31% | 31% | 32% | 33% | 34% | 34% | 35% |
| 4.9% | 27% | 28% | 28% | 29% | 30% | 31% | 31% | 32% | 33% | 34% | 34% |

The use of pellets allows for significantly higher moistures in the dough, as there is an intermediate stage before expansion of the product. The pellet process allows for a much wider variation in parameters than DX products (such as, but not limited to, temperature, pressure, and moisture levels, among others), thereby allowing for the use of processing aids (such as, but not limited to, calcium car- From the dough, the product would then be dried and popped into the finished product, which is a 2.5% moisture puff. By analyzing how much moisture was flashed off during drying and expansion, the ratio of fruit/vegetable solids remaining in the final product was determined, as shown in Table 4.

TABLE 4

TS % Fruit/Vegetable in 2.5% Moisture Popped Snack

| Rice | Wheat | | | | | | | | | | |
|---|---|---|---|---|---|---|---|---|---|---|---|
| | 41% | 40% | 39% | 38% | 37% | 36% | 35% | 34% | 33% | 32% | 31% |
| 52% | 4.4% | 4.6% | 4.9% | 5.1% | 5.3% | 5.6% | 5.8% | 6.1% | 6.4% | 6.6% | 6.9% |
| 53% | 4.2% | 4.4% | 4.6% | 4.9% | 5.1% | 5.3% | 5.6% | 5.8% | 6.1% | 6.3% | 6.6% |
| 54% | 4.0% | 4.2% | 4.4% | 4.6% | 4.9% | 5.1% | 5.3% | 5.6% | 5.8% | 6.1% | 6.3% |
| 54% | 3.8% | 4.0% | 4.2% | 4.4% | 4.6% | 4.9% | 5.1% | 5.3% | 5.6% | 5.8% | 6.1% |
| 55% | 3.6% | 3.8% | 4.0% | 4.2% | 4.4% | 4.6% | 4.9% | 5.1% | 5.3% | 5.6% | 5.8% |
| 56% | 3.4% | 3.6% | 3.8% | 4.0% | 4.2% | 4.4% | 4.6% | 4.9% | 5.1% | 5.3% | 5.6% |
| 56% | 3.2% | 3.4% | 3.6% | 3.8% | 4.0% | 4.2% | 4.4% | 4.6% | 4.9% | 5.1% | 5.3% |
| 57% | 3.0% | 3.2% | 3.4% | 3.6% | 3.8% | 4.0% | 4.2% | 4.4% | 4.6% | 4.9% | 5.1% |
| 58% | 2.8% | 3.0% | 3.2% | 3.4% | 3.6% | 3.8% | 4.0% | 4.2% | 4.4% | 4.6% | 4.9% |
| 58% | 2.6% | 2.8% | 3.0% | 3.2% | 3.4% | 3.6% | 3.8% | 4.0% | 4.2% | 4.4% | 4.6% |
| 59% | 2.5% | 2.6% | 2.8% | 3.0% | 3.2% | 3.4% | 3.6% | 3.8% | 4.0% | 4.2% | 4.4% |

Next, the regulatory serving sizes for each fruit/vegetable ingredient were determined so that the target amounts to be present in the expanded or popped snack product could be understood. By using the USDA database for food servings and average water content, the amount of solids in a ¼ cup serving were determined, as shown in Table 5.

TABLE 5

USDA Serving Sizes Total Solids

| USDA # | Description | 1 cup (g) | Water (g) | % solids | Solids 2 oz serving (g) |
|---|---|---|---|---|---|
| 09003 | Apples raw with skin medium(¼ to ½ apple) | 109 | 93.26 | 14.44% | 3.93 |
| 09040 | Bananas raw (¼ to 1 medium banana) | 225 | 168.55 | 25.09% | 3.70 |
| 09042 | Blackberries (3-10) | 144 | 126.94 | 11.85% | 4.27 |
| 09050 | Blueberries (3-10) | 148 | 124.63 | 15.44% | 5.71 |
| 09070 | Cherries sweet red (3-10) | 155 | 133.5 | 17.80% | 6.90 |
| 09252 | Pears raw (¼ to ¾ fruit) | 140 | 117.54 | 16.04% | 2.97 |
| 09302 | Raspberries raw (3-10) | 123 | 105.47 | 14.21% | 4.37 |
| 09316 | Strawberries raw (3-10) organic | 232 | 211 | 9.00% | 1.10 |
| 11124 | Carrots raw (1-3 tbsp) | 128 | 113.01 | 11.71% | 3.75 |
| 11457 | Spinach raw (0.5-2 tbsp) | 30 | 27.42 | 8.60% | 0.65 |
| 11965 | Cauliflower green raw (0.5-2 tbsp) | 64 | 57.47 | 10.20% | 1.63 |
| 11135 | Cauliflower raw (0.5-2 tbsp) | 107 | 98.51 | 7.93% | 2.12 |
| 11355 | Potato (1-4 tbsp) | 75 | 59.44 | 20.75% | 3.89 |
| 11643 | Squash winter butternut (0.5-2 tbsp) | 140 | 120.97 | 13.59% | 4.76 |
| 11507 | Sweet potato raw unprepared (1-4 tbsp) | 133 | 102.78 | 22.72% | 7.56 |
| 11529 | Tomatoes red ripe raw year round avg (0.25-1 small tomato) | 180 | 170.14 | 5.48% | 0.62 |
| 11233 | Kale | 21 | 18.8 | 10% | 2.18 |
| 16056 | Chickpea | 200 | 15.36 | 92.32% | 46.16 |

Using the ratios of the solids in the finished product, the number of servings of fruit/vegetable present in the finished product can be extrapolated based on the USDA serving sizes and the current popped snack package size of 7 g. This is a "reconstituted" volume, which is equivalent to the amount of fruit/vegetable puree added to the recipe. Use of reconstituted volumes is not allowed from a regulatory standpoint when fruit or vegetable powders or concentrates are utilized, as it is argued that essential elements are lost in the evaporation process; however, since the entire fruit/vegetable is present in a puree, these losses do not apply. Therefore, the finished product delivers the number of servings as shown in Table 6.

TABLE 6

Servings of Fruit per 7 g (Target >1) (Reconstituted)*

| 1.17 | 1.21 | 1.26 | 1.30 | 1.34 | 1.39 | 1.43 | 1.48 | 1.52 | 1.56 | 1.61 |
|---|---|---|---|---|---|---|---|---|---|---|
| 1.12 | 1.17 | 1.21 | 1.26 | 1.30 | 1.34 | 1.39 | 1.43 | 1.48 | 1.52 | 1.56 |
| 1.08 | 1.12 | 1.17 | 1.21 | 1.26 | 1.30 | 1.34 | 1.39 | 1.43 | 1.48 | 1.52 |
| 1.04 | 1.08 | 1.12 | 1.17 | 1.21 | 1.26 | 1.30 | 1.34 | 1.39 | 1.43 | 1.48 |
| 0.99 | 1.04 | 1.08 | 1.12 | 1.17 | 1.21 | 1.26 | 1.30 | 1.34 | 1.39 | 1.43 |
| 0.95 | 0.99 | 1.04 | 1.08 | 1.12 | 1.17 | 1.21 | 1.26 | 1.30 | 1.34 | 1.39 |
| 0.90 | 0.95 | 0.99 | 1.04 | 1.08 | 1.12 | 1.17 | 1.21 | 1.26 | 1.30 | 1.34 |
| 0.86 | 0.90 | 0.95 | 0.99 | 1.04 | 1.08 | 1.12 | 1.17 | 1.21 | 1.26 | 1.30 |
| 0.82 | 0.86 | 0.90 | 0.95 | 0.99 | 1.04 | 1.08 | 1.12 | 1.17 | 1.21 | 1.26 |
| 0.77 | 0.82 | 0.86 | 0.90 | 0.95 | 0.99 | 1.04 | 1.08 | 1.12 | 1.17 | 1.21 |
| 0.73 | 0.77 | 0.82 | 0.86 | 0.90 | 0.95 | 0.99 | 1.04 | 1.08 | 1.12 | 1.17 |

*Cells correspond to the same matrix position as TS % in Table 4 and % Moisture in Table 3

As can be seen, the amount of servings present in the finished product depended heavily upon which ingredients were used. For example, tomato, spinach, cauliflower, strawberry, and pear provided the most servings per volume of puree. Tomato and spinach only required 10% puree in the dough to deliver a full serving, while strawberry only required 16% puree in the dough to deliver a full serving. In contrast, cauliflower required 27% puree in the dough to deliver a full serving, while apple required 27% puree in the dough to deliver one-half (0.5) of a serving.

From this information on serving size capability of each ingredient, it was possible to optimize the ratios of each recipe to deliver the target of at least one serving of fruit or vegetable. Two recipes were then developed for each ingredient combination (a high percentage and a low percentage fruit/vegetable) to understand the capability of each; the exception was apple, as any amount lower than 20% did not yield a sufficient serving size of fruit content, and therefore only a single recipe was developed. These recipes were chosen because they provide a wide spectrum of information about the capability of the methods of the present disclosure. Puree was used in an amount in a range of from 10% to 27%, and a range of 0.48 to 3.0 servings of fruit/vegetables in the finished product were achieved, as shown in Table 7.

TABLE 7

Trial Recipe Matrix and Number of Servings Achieved

| Name | Rice | Wheat | Water | Puree 1 | Puree 2 | # Servings | Dough Moisture |
|---|---|---|---|---|---|---|---|
| Base | 50% | 30% | 20% | 0% | | — | 29% |
| Apple | 44% | 26% | 3.0% | 27% | | 0.48 | 34% |
| Strawberry Low | 50% | 30% | 10% | 10% | | 0.57 | 29% |
| Strawberry High | 50% | 30% | 5% | 15% | | 1.00 | 28% |
| Strawberry/ Apple Low | 50% | 30% | 3.0% | 10% | 7% | 0.77 | 28% |
| Strawberry/ Apple High | 46% | 27% | 3.0% | 14% | 10% | 1.04 | 32% |
| Tomato Low | 50% | 30% | 10% | 10% | | 1.20 | 29% |
| Tomato High | 44% | 26% | 5% | 25% | | 2.75 | 36% |
| Tomato/ Spinach Low | 50% | 30% | 3.0% | 16% | 1% | 1.91 | 29% |
| Tomato/ Spinach High | 44% | 27% | 3.0% | 24% | 2% | 3.00 | 35% |

In the next stage, pellets were created by extruding the dough mixture containing puree and cutting them into small star-shaped pieces which could subsequently be expanded using a hot air popper. However, it should be noted that the star shape is simply for purposes of illustration only; any type of shape and size may be utilized for the expanded/popped snack products produced in accordance with the present disclosure.

Results

Figure 2:
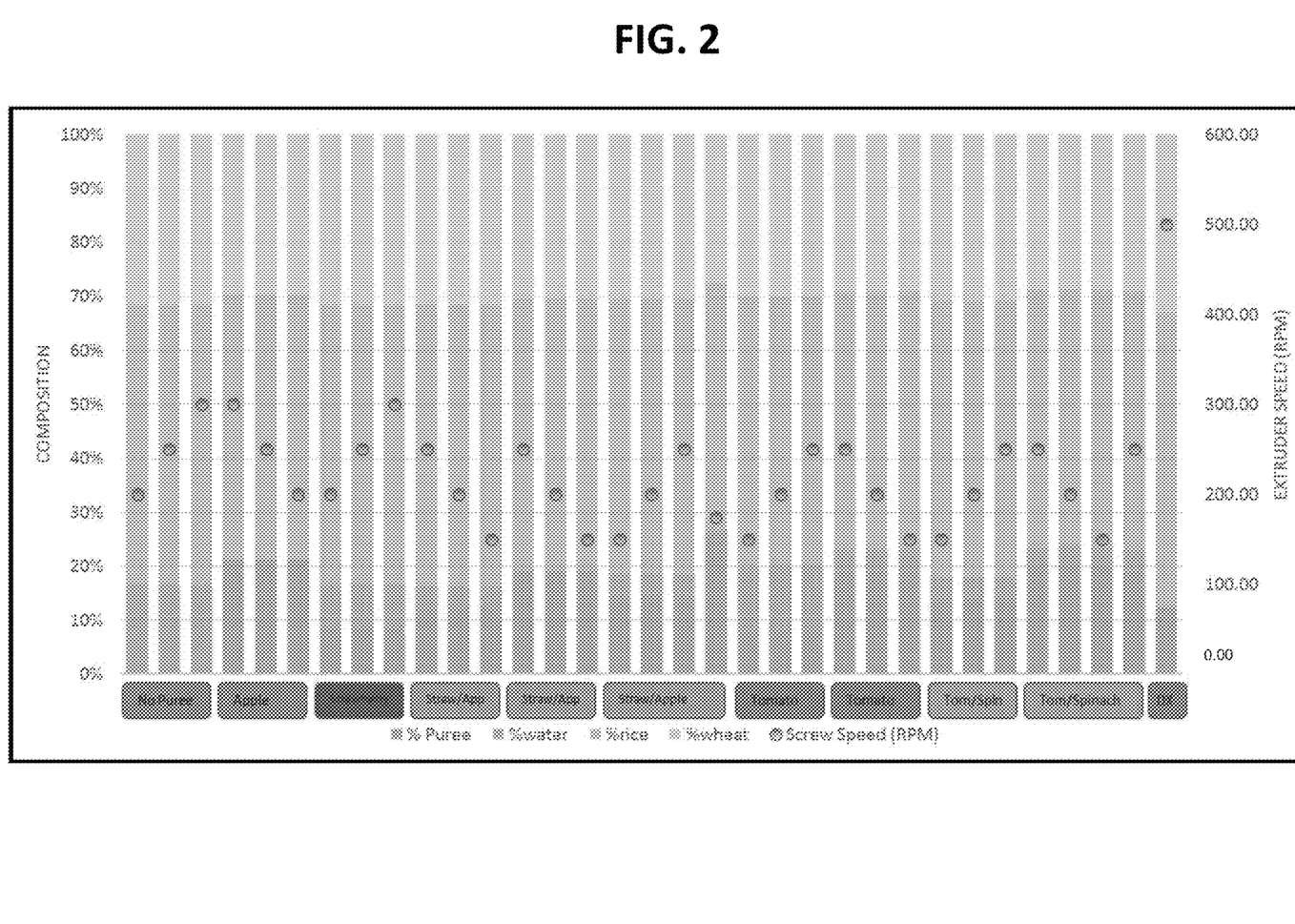
FIG. 2 graphically illustrates trial samples of the expanded or popped snack product produced in accordance with the present disclosure.

In addition to finalizing the recipes, different extruder settings were locked in to create a variable to determine texture and developmental appropriateness by choosing three Screw Speeds for each recipe, as these were found to be directly correlated to the Specific Mechanical Energy (SME) input by the extruder and were easy parameters to adjust when running the equipment. Depending on the SME, the texture will change dramatically; a low SME product will create more of a "Cheeto" texture that is very crunchy and does not dissolve in the mouth as easily, whereas a high SME will create a texture that is much softer and dissolves easily like current "Puff"-type products do. FIG. 2 graphically illustrates the samples that were collected during this test.

Figure 3:
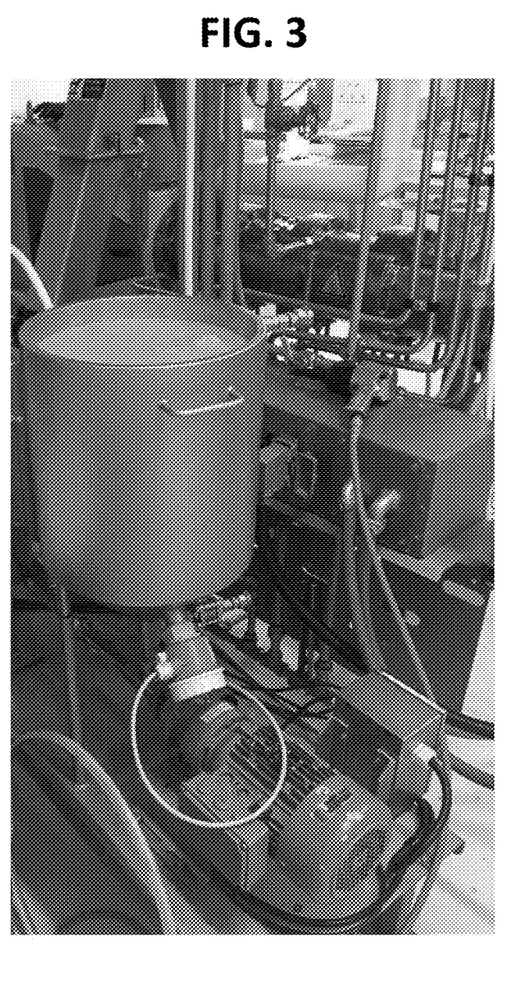
FIG. 3 depicts a machine layout for use in producing dough and pellets in the method of preparing the expanded or popped snack product.
Figure 4:
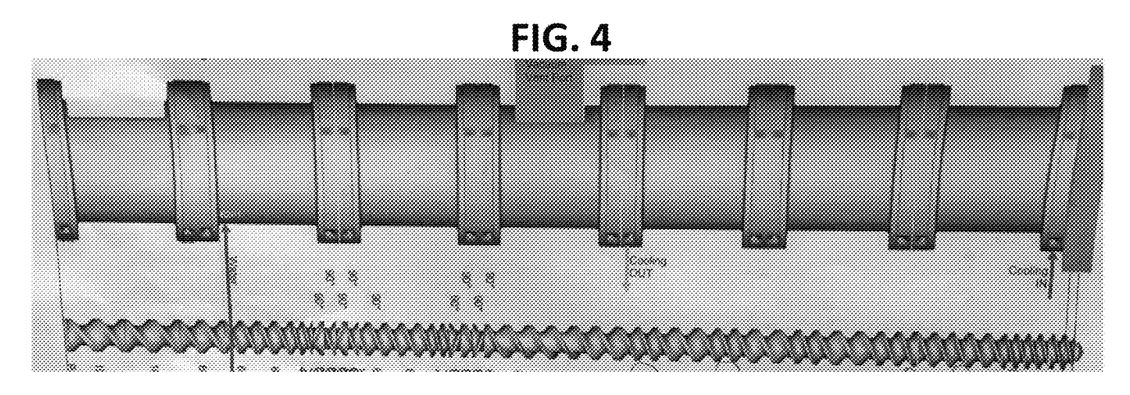
FIG. 4 schematically depicts an extruder screw profile used in the method of preparing the expanded or popped snack product.
Figure 5:
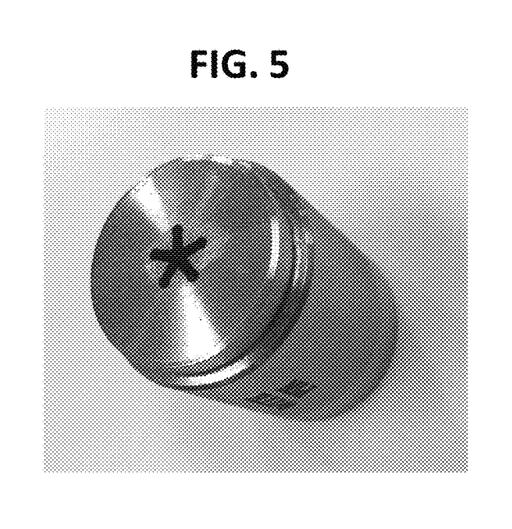
FIG. 5 depicts an extrusion die for use in accordance with the present disclosure.

Two tanks with pumps that provided flow meter controlled addition into the extruder were utilized, and this setup provided for easy addition of up to two different purees at a time. FIG. 3 depicts the tank and pump used in one of the recipes. FIG. 4 depicts the machine layout and extruder screw profile that was utilized in the production of the product. FIG. 5 depicts an extrusion die that was utilized in the production of the product. However, these structures are depicted for purposes of example only and are not to be considering limiting of the present disclosure.

Figure 6:
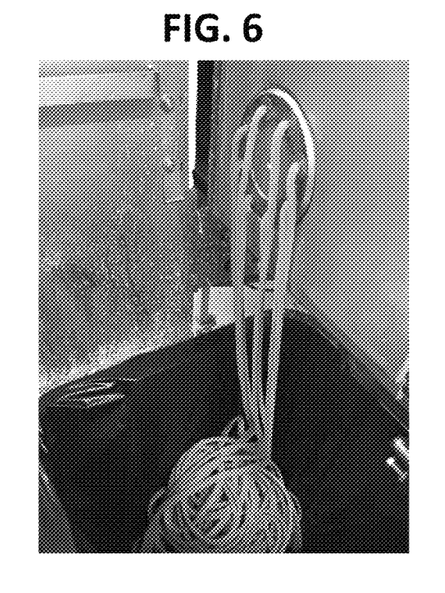
FIG. 6 depicts extrusion of a tomato puree-containing dough out of an extruder in accordance with the present disclosure.

FIG. 6 depicts extrusion of a tomato puree-containing dough out of an extruder in accordance with the present disclosure.

Figure 7:
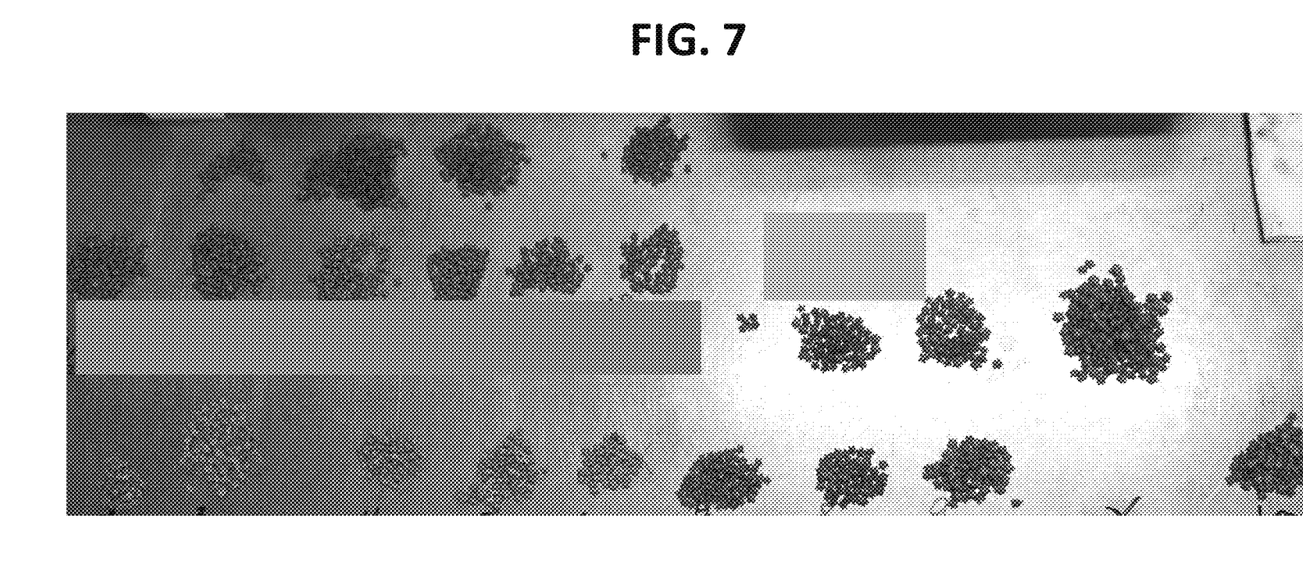
FIG. 7 depicts various different pellets produced from fruit and/or vegetable puree-containing dough in accordance with the methods of the present disclosure.
Figure 8:
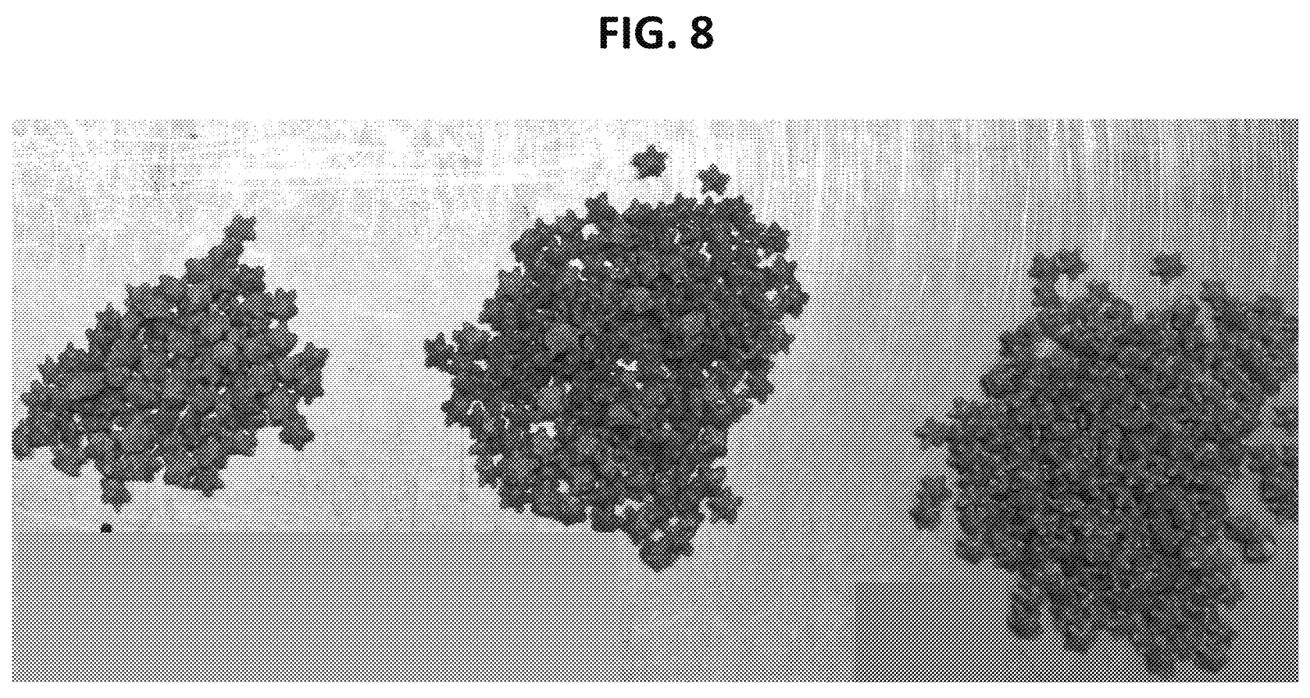
FIG. 8 depicts pellets containing 15% strawberry puree and extruded at different screw speeds (left, 250 rpm; middle, 200 rpm; and right, 150 rpm); this amount of strawberry puree provides 1.0 serving of fruit in a single serving of the final snack product.

Using the methods described herein above, pellets were produced from many different fruit and/or vegetable puree-containing doughs, as shown in FIG. 7. In particular, FIG. 8 contains a set of strawberry pellets made as described herein and containing 15% strawberry puree and produced at varying screw speeds (left, 250 rpm; middle, 200 rpm; and right, 150 rpm). As can be seen, the pellets started to bubble and pop at the higher screw speeds because the dough started to flash and expand at the die plate exiting the extruder with the higher energy input. Lower screw speeds alleviated this and created a much more even and properly gelatinized pellet. Also, it is noted that the pellets shown in FIG. 8 exhibited minor browning of the strawberry puree but otherwise good coloration.

However, if higher energies are required to meet the texture or popping requirements of the product, then more energy can be input without flashing the dough by utilizing a two stage operation containing two extruders: one to cook the dough and input very high energy and shear to the product, and another to apply significant amounts of cooling and mixing to bring the dough back down to the proper levels to create a pellet.

Figure 9:
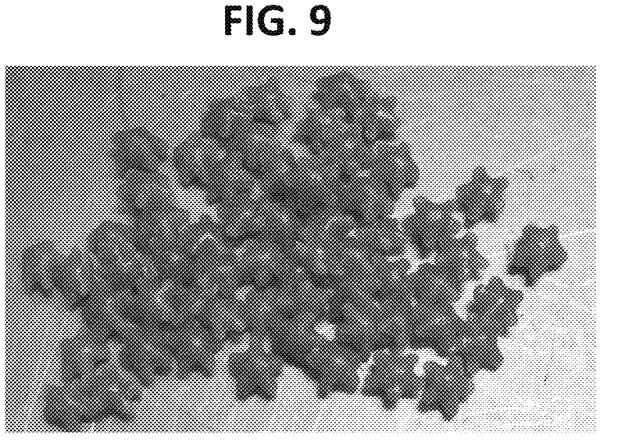
FIG. 9 depicts pellets produced from a multi-strength dough containing apple puree and strawberry puree at 7% and 10%, respectively, and extruded at 200 rpm; this amount of puree provides 0.77 serving of fruit in a single serving of the final snack product.

In addition, multi-ingredient pellets produced as described herein are shown in FIG. 9. These pellets contained apple puree and strawberry puree at 7% and 10%, respectively, and were extruded using a screw speed of 200 rpm.

Figure 10:
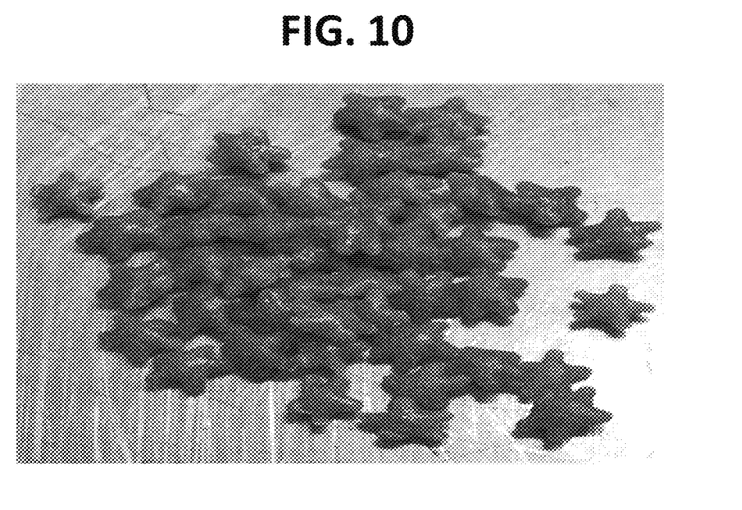
FIG. 10 depicts pellets containing 25% tomato puree (screw speed of 50 rpm); this amount of tomato puree provides 2.75 servings of vegetable in a single serving of the final snack product.

Tomato pellets were also made as described herein and are shown in FIG. 10. These tomato pellets contained 25% puree and were produced using a screw speed of 250 rpm.

Following formation of the pellets by extrusion or other methods known in the art, the pellets can be subjected to any of air popping, compression popping, or direct expansion to produce the expanded/popped snack product. Methods and devices utilized for air popping, compression popping, and direct expansion are all well known in the art; therefore, no further description thereof is considered necessary for performance of the methods of the present disclosure.

Figure 11:
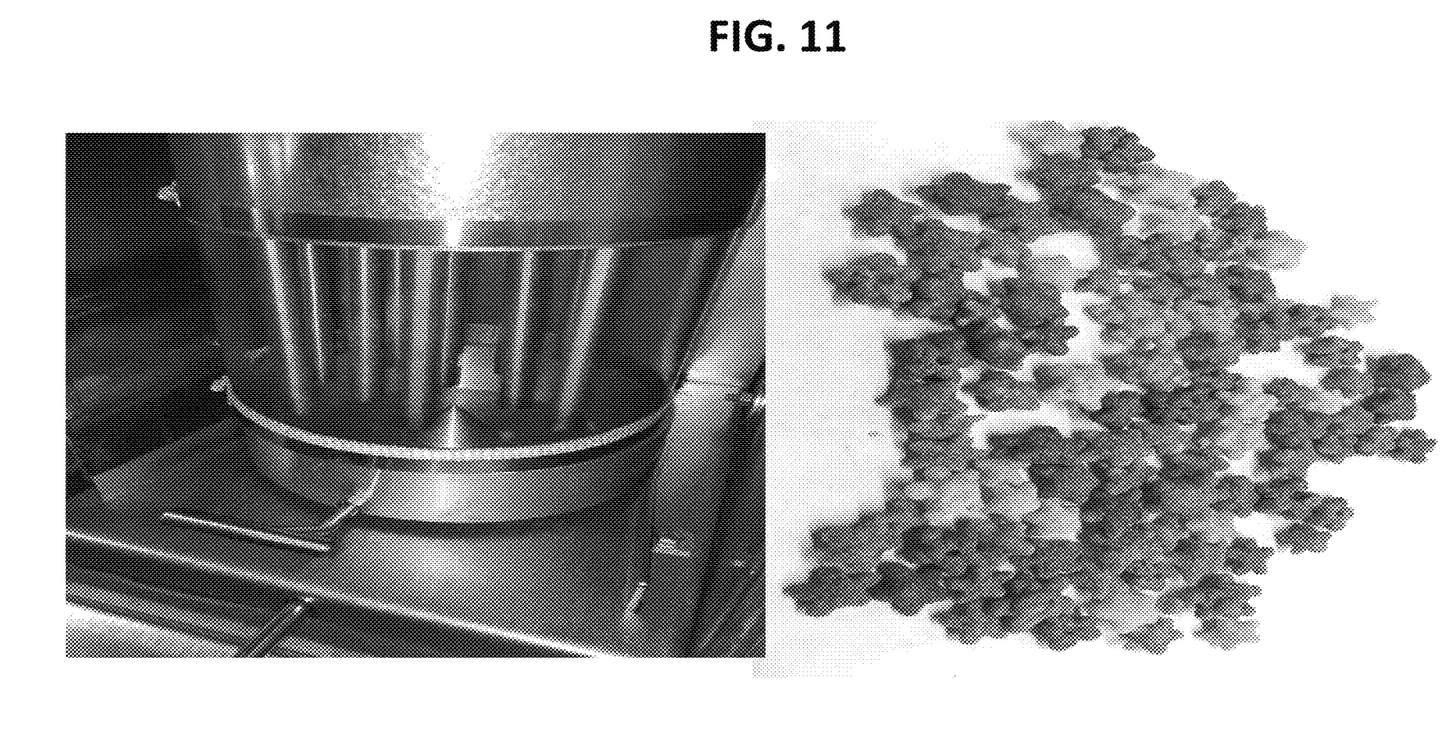
FIG. 11 depicts popping equipment (left panel) for producing popped pellets (right panel) from the extruded pellets.

FIG. 11 depicts popping equipment utilized (left panel), as well as some popped pellets that were produced as described above and using the popping equipment (right panel). Various times and temperatures can be utilized to obtain the desired amount of expansion. While some expansion was observed in the experiment shown in FIG. 11 (right panel), the level of expansion obtained was not as high as that of the current "puff"-type products.

Figure 12:
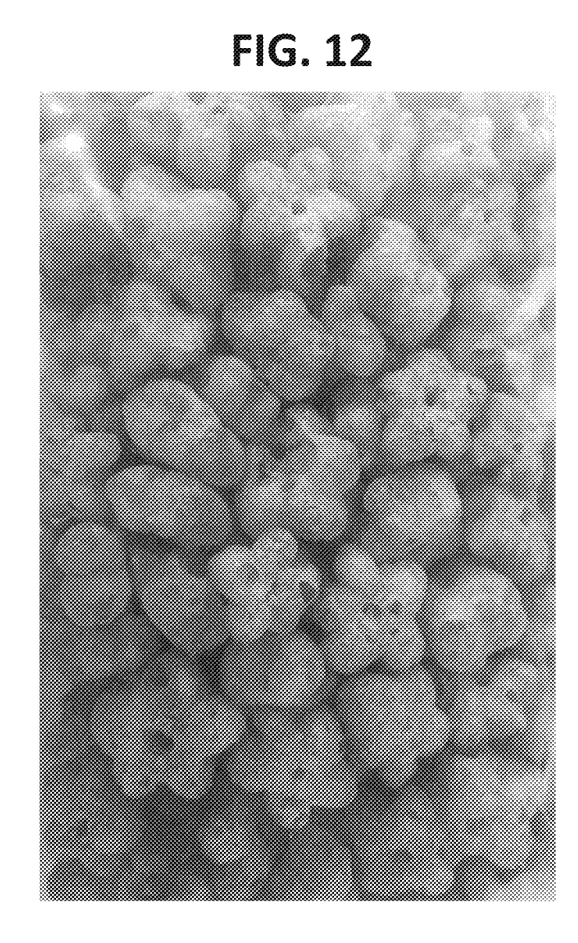
FIG. 12 depicts direct expansion tomato puffs produced using 25% tomato puree (thus providing 2.75 servings of vegetables in a single serving of the tomato puffs).

Therefore, the use of direct expansion techniques were also tested, given the excessive amount of bubbling and expansion observed in the dough due to high temperature and pressures from the screw speed utilized. Using direct expansion techniques, a finished product produced using a 14% tomato puree-containing dough extruded at a screw speed of 500 rpm expanded very well out of the extruder and had a texture that is very similar to the current "puff"-type products, as shown in FIG. 12.

Thus, in accordance with the present disclosure, there have been provided compositions as well as methods of producing and using same which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

What is claimed is:

1. A shelf stable, expanded or popped snack product designed for consumption by a child, the expanded or popped snack product comprising:
   at least one fruit ingredient and/or at least one vegetable ingredient, the at least one fruit ingredient and/or at least one vegetable ingredient is about 10 wt. % (dwb) to about 30% wt. % (dwb) of the expanded or popped snack product;
   at least one whole grain ingredient that is about 60 wt. % (dwb) to about 85 wt. % (dwb) of the expanded or popped snack product; and
   wherein the expanded or popped snack product has an acrylamide concentration less than about 150 ppm.

2. The expanded or popped snack product of claim 1, wherein the expanded or popped snack product is formulated for consumption by a child aged from about 6 months to about 48 months.

3. The expanded or popped snack product of claim 1, further comprising at least one processing aid selected from the group consisting of calcium carbonate, citric acid, asparaginase, and combinations thereof.

4. The expanded or popped snack product of claim 1, wherein the at least one fruit and/or at least one vegetable ingredient comprises a fruit or vegetable puree.

5. The expanded or popped snack product of claim 1, wherein the at least one fruit ingredient and/or at least one vegetable ingredient comprises at least two ingredients selected from the group consisting of: two or more fruit ingredients; two or more vegetable ingredients; and at least one fruit ingredient and at least one vegetable ingredient.

6. The expanded or popped snack product of claim 1, wherein a single serving of the expanded or popped snack product is about 7 g.

7. The expanded or popped snack product of claim 1, wherein the at least one whole grain ingredient is present in an amount in a range from about 65 wt. % (dwb) to about 85 wt. % (dwb) of the expanded or popped snack product.

8. The expanded or popped snack product of claim 1, wherein the at least one whole grain ingredient is selected from the group consisting of rice flour, wheat flour, and combinations thereof.

9. The expanded or popped snack product of claim 1, wherein the at least one whole grain ingredient comprises rice flour and wheat flour, and wherein the rice flour is present in a range from about 40 wt. % (dwb) to about 50 wt. % (dwb), and the wheat flour is present in a range from about 20 wt. % (dwb) to about 35 wt. % (dwb) of the expanded or popped snack product.

10. A method of producing an expanded or popped snack product, the method comprising:
   (a) forming a plurality of pellets from a dough, wherein the dough comprises at least one fruit ingredient and/or at least one vegetable ingredient and further comprises at least one whole grain ingredient;
   (b) subjecting the pellets to a treatment step to form the expanded or popped snack product, wherein the treatment step is selected from the group consisting of direct expansion, air popping, and compression popping, and wherein the expanded or popped snack product has an acrylamide concentration of less than about 150 ppm, wherein the at least one fruit ingredient and/or at least one vegetable ingredient is about 10 wt. % (dwb) to about 30 wt. % (dwb) of the expanded or popped snack product, and the at least one whole grain ingredient is about 60 wt. % (dwb) to about 85 wt. % (dwb) of the expanded or popped snack product.

11. The method of claim 10, wherein step (a) comprises extruding the dough through an extrusion die to form the plurality of pellets.

12. The method of claim 10, wherein the expanded or popped snack product is formulated for consumption by a child aged from about 6 months to about 48 months.

13. The method of claim 10, wherein the dough further comprises at least one processing aid selected from the group consisting of calcium carbonate, citric acid, asparaginase, and combinations thereof.

14. The method of claim 10, wherein the at least one fruit and/or at least one vegetable ingredient present in the dough comprises a fruit or vegetable puree.

15. The method of claim 10, wherein the at least one fruit ingredient and/or at least one vegetable ingredient comprises at least two ingredients selected from the group consisting of: two or more fruit ingredients; two or more vegetable ingredients; and at least one fruit ingredient and at least one vegetable ingredient.

16. The method of claim 10, wherein a single serving of the product is about 7 g.

17. The method of claim 10, wherein: the at least one whole grain ingredient is present in the dough in an amount in a range from about 65 wt. % (dwb) to about 85 wt. % (dwb); and the dough comprises added water in an amount in a range from about 0.5 wt. % (dwb) to about 15 wt. % (dwb).

18. The method of claim 10, wherein the dough has a total moisture content in a range from about 25 wt. % (dwb) to about 40 wt. % (dwb).

19. The method of claim 10, wherein the at least one whole grain ingredient is selected from the group consisting of rice flour, wheat flour, and combinations thereof.

20. The method of claim 10, wherein the at least one whole grain ingredient comprises rice flour and wheat flour, and wherein the rice flour is present in the dough in a range from about 40 wt. % (dwb) to about 50 wt. % (dwb) and the wheat flour is present in the dough in a range from about 20 wt. % (dwb) to about 35 wt. % (dwb).

* * * * *